United States Patent
Chen et al.

(10) Patent No.: US 11,025,870 B2
(45) Date of Patent: Jun. 1, 2021

(54) CONTROL SYSTEM AND METHOD FOR A PROJECTOR

(71) Applicant: APPOTRONICS CORPORATION LIMITED, Guangdong (CN)

(72) Inventors: Kairong Chen, Guangdong (CN); Hao Jiang, Guangdong (CN); Qitao Song, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/628,902

(22) PCT Filed: Dec. 6, 2017

(86) PCT No.: PCT/CN2017/114711
§ 371 (c)(1),
(2) Date: Jun. 12, 2020

(87) PCT Pub. No.: WO2019/006982
PCT Pub. Date: Jan. 10, 2019

(65) Prior Publication Data
US 2020/0319543 A1    Oct. 8, 2020

(30) Foreign Application Priority Data

Jul. 6, 2017    (CN) .......................... 201710548118.1

(51) Int. Cl.
*H04N 9/31* (2006.01)
*G02B 26/00* (2006.01)
(Continued)

(52) U.S. Cl.
CPC ......... *H04N 9/3114* (2013.01); *G02B 26/008* (2013.01); *G03B 21/2053* (2013.01);
(Continued)

(58) Field of Classification Search
CPC .. G03B 33/08; G03B 21/2053; G02B 26/008; H04N 9/3111; H04N 9/3114; H04N 9/3117; H04N 9/3155
See application file for complete search history.

(56) References Cited

U.S. PATENT DOCUMENTS 5,706,061 A * 1/1998 Marshall ............. H04N 9/3114
348/742
6,719,429 B2 * 4/2004 Peterson ............... G03B 33/08
348/742
(Continued)

FOREIGN PATENT DOCUMENTS

| CN | 1717028 | 1/2006 |
|----|---------|--------|
| CN | 1811897 | 8/2006 |

(Continued)

OTHER PUBLICATIONS

International Search Report for International Application PCT/CN2017/114711, dated Apr. 4, 2018.
(Continued)

*Primary Examiner* — Bao-Luan Q Le
(74) *Attorney, Agent, or Firm* — Burris Law, PLLC (57) ABSTRACT

A projector control system and a control method corresponding to same. The system includes a main controller, a dynamic current adjusting module, a color wheel controller, a color wheel rotation speed feedback module, and a light source; the dynamic current adjusting module includes a DLP module, a light source controller, and a power supply module; the color wheel rotation speed feedback module generates a feedback signal; the DLP module receives the feedback signal, and the DLP module receives dynamic brightness information and sends processed dynamic brightness information and a control signal to the light source controller according to the feedback signal; the light source controller controls the power module according to the
(Continued)

received processed dynamic brightness information and the control signal sent by the DLP module to turn on a power switch and output a corresponding current value.

10 Claims, 3 Drawing Sheets

(51) Int. Cl.
*G03B 21/20* (2006.01)
*G03B 33/08* (2006.01)
(52) U.S. Cl.
CPC ........... *G03B 33/08* (2013.01); *H04N 9/3111* (2013.01); *H04N 9/3117* (2013.01); *H04N 9/3155* (2013.01)

(56) References Cited

U.S. PATENT DOCUMENTS

| | | | | |
|---|---|---|---|---|
| 7,050,120 B2* | 5/2006 | Allen | .................... | H04N 9/3114 348/742 |
| 7,339,631 B2* | 3/2008 | Ahn | .................... | H04N 9/3114 348/743 |
| 7,347,568 B2* | 3/2008 | Jin | .................... | G03B 21/14 348/743 |
| 7,369,762 B2* | 5/2008 | Tanaka | .................... | G03B 29/00 396/429 |
| 8,040,440 B2* | 10/2011 | Haraguchi | .................... | G03B 21/14 348/743 |
| 8,408,719 B2* | 4/2013 | Shibasaki | .................... | H04N 9/3155 353/94 |
| 8,465,158 B2* | 6/2013 | Suzuki | .................... | G03B 21/2013 353/85 |
| 8,979,278 B2* | 3/2015 | Narikawa | .................... | G03B 21/2013 353/85 |
| RE45,504 E * | 5/2015 | Peterson | .................... | G03B 21/2026 353/69 |
| 9,155,161 B2* | 10/2015 | Murai | .................... | G03B 21/2013 |
| 9,294,749 B2* | 3/2016 | Oda | .................... | H04N 9/3182 |
| 9,300,929 B2* | 3/2016 | Kashiwagi | .................... | G03B 33/08 |
| 9,380,278 B2* | 6/2016 | Yamaguchi | .................... | H04N 9/3182 |
| 9,467,667 B2* | 10/2016 | Hu | .................... | G03B 21/206 |
| 9,544,553 B2* | 1/2017 | Lee | .................... | H04N 9/3194 |
| 9,544,554 B2* | 1/2017 | Murai | .................... | G03B 21/2086 |
| 9,638,915 B2* | 5/2017 | Chang | .................... | H04N 9/3114 |
| 9,958,763 B2* | 5/2018 | Ishizu | .................... | G03B 33/08 |
| 2002/0140911 A1* | 10/2002 | Peterson | .................... | G03B 21/2026 353/99 |
| 2003/0142241 A1* | 7/2003 | Allen | .................... | H04N 9/3114 348/742 |
| 2005/0179824 A1* | 8/2005 | Ahn | .................... | H04N 9/3114 348/743 |
| 2006/0067673 A1* | 3/2006 | Tanaka | .................... | H04N 5/232 396/429 |
| 2006/0126030 A1* | 6/2006 | Jin | .................... | G02B 26/008 353/84 |
| 2006/0126198 A1* | 6/2006 | Niwa | .................... | H04N 9/3114 359/892 |
| 2007/0171313 A1* | 7/2007 | Haraguchi | .................... | H04N 9/3155 348/743 |
| 2008/0174744 A1* | 7/2008 | Myoung | .................... | G03B 33/08 353/84 |
| 2008/0297734 A1* | 12/2008 | Seo | .................... | G03B 21/28 353/81 |
| 2010/0079730 A1* | 4/2010 | Shibasaki | .................... | H04N 9/3164 353/31 |
| 2011/0043764 A1* | 2/2011 | Narikawa | .................... | G03B 21/204 353/31 |
| 2011/0128507 A1* | 6/2011 | Suzuki | .................... | G03B 33/08 353/31 |
| 2012/0188516 A1* | 7/2012 | Kashiwagi | .................... | G03B 21/204 353/31 |
| 2013/0057661 A1* | 3/2013 | Oda | .................... | G09G 3/003 348/51 |
| 2013/0063704 A1* | 3/2013 | Hu | .................... | G03B 33/08 353/31 |
| 2013/0201408 A1* | 8/2013 | Murai | .................... | G03B 21/2013 348/744 |
| 2014/0198261 A1* | 7/2014 | Yamaguchi | .................... | H04N 9/3182 348/744 |
| 2014/0204346 A1* | 7/2014 | Lee | .................... | H04N 9/3114 353/31 |
| 2015/0109584 A1* | 4/2015 | Murai | .................... | H04N 9/3161 353/31 |
| 2016/0195715 A1* | 7/2016 | Chang | .................... | G02B 26/008 353/31 |
| 2016/0274448 A1* | 9/2016 | Ishizu | .................... | G03B 21/206 |

FOREIGN PATENT DOCUMENTS

| | | |
|---|---|---|
| CN | 101315513 | 12/2008 |
| CN | 101369090 | 2/2009 |
| CN | 101750855 | 6/2010 |
| CN | 101990787 | 3/2011 |
| CN | 101990788 | 3/2011 |
| CN | 102645828 | 8/2012 |
| CN | 105763821 | 7/2016 |
| CN | 105828055 | 8/2016 |
| CN | 106021050 | 10/2016 |
| CN | 106842784 | 6/2017 |
| EP | 1672932 | 6/2006 |

OTHER PUBLICATIONS

Office Action dated Nov. 3, 2020 in corresponding CN application 201710548118.1, and English translation.

* cited by examiner

CONTROL SYSTEM AND METHOD FOR A PROJECTOR

CROSS-REFERENCE TO RELATED APPLICATIONS

This application is a national phase of International Application No. PCT/CN2017/114711, filed on Dec. 6, 2017, which claims priority to and the benefit of CN 2017105481181, filed on Jul. 6, 2017. The disclosures of the above applications are incorporated herein by reference.

FIELD

The present disclosure relates to the field of projection technology, and in particular, to a control system and a control method of a projector.

BACKGROUND

The statements in this section merely provide background information related to the present disclosure and may not constitute prior art.

TECHNOLOGY

An existing projector of a DLP (Digital Light Processing) technology comprises a light source system using a time-sequence color wheel mixing method, in which the light source sequentially projects a red image, a green image, and a blue image through a color wheel and performs color mixture to form a color image. Color quality of an image finally formed by the projector is determined by intensity of the light source irradiating on the color wheel. As the market requires an increasing power of the light source system, various high-power light sources continue to emerge, such that the color wheel in the light source system receives more and more light energy. When the color wheel moves at a high speed, the light energy will not be concentrated in a fixed segment in a unit time.

However, if there is an accident, such as failure of an opto-mechanical system, so that the color wheel stops rotating suddenly or a rotation speed of the color wheel is significantly reduced, then in a unit time the light energy will cause the color wheel to be burned due to local concentration of too high heat. In addition, when the rotation speed of the color wheel changes, dynamic control of a main controller is not timely, so that the rotation speed of the color wheel does not match a time interval at which the main controller sends out different signals, and intensity of light received by a partial certain region of the color wheel changes, thereby resulting in poor imaging effects.

SUMMARY

This section provides a general summary of the disclosure and is not a comprehensive disclosure of its full scope or all of its features.

The main technical solution provided by the present disclosure is a control system and a control method of a projector, which can dynamically adjust the main controller in real time to send out different signals based on an actual rotation speed of the color wheel, in order to provide safety and an imaging effect of the color wheel of the projector.

The technical solution provided by the present disclosure is to provide a control system of a projector, including: a main controller; a dynamic current adjustment module including a DLP module, a light source controller, and a power module; a color wheel controller configured to control rotation of a color wheel based on a control signal of the DLP module; a color wheel rotation speed feedback module configured to generate a feedback signal including an actual rotation speed value of the color wheel; and a light source. The DLP module is configured to receive the feedback signal sent from the color wheel rotation speed feedback module. The main controller is configured to send dynamic brightness information to the DLP module. The dynamic brightness information sent from the main controller includes brightness information of the light source. The DLP module is further configured to receive the dynamic brightness information from the main controller and send, based on the feedback signal from the color wheel rotation speed feedback module, processed dynamic brightness information and a control signal to the light source controller, the processed dynamic brightness information sent from the DLP module includes the brightness information of the light source and time-sequence control information that matches respective sections of the color wheel. The light source controller is configured to control, based on the received processed dynamic brightness information and the control signal sent from the DLP module, the power module to turn on a power switch and output a corresponding current value. The power module is configured to drive, based on the corresponding current value that is output, the light source to emit light.

The technical solution of the present disclosure further provides a control system of a projector, including: a main controller; a color wheel protection and dynamic current adjustment module including a DLP module, a light source controller, a color wheel rotation speed feedback module, and a power module; a color wheel controller configured to control rotation of a color wheel based on a control signal of the DLP module; and a light source. The color wheel rotation speed feedback module is configured to generate, after the color wheel has rotated, a feedback signal including an actual rotation speed value of the color wheel. The DLP module and the light source controller receive the feedback signal sent from the color wheel rotation speed feedback module. The main controller is configured to send dynamic brightness information to the DLP module, the dynamic brightness information sent from the main controller including brightness information of the light source. The DLP module is configured to receive the dynamic brightness information of the main controller and send, based on the feedback signal of the color wheel rotation speed feedback module, processed dynamic brightness information and the control signal to the light source controller, the processed dynamic brightness information sent from the DLP module includes the brightness information of the light source and time-sequence control information that matches sections of the color wheel. The light source controller is configured to, when the actual rotation speed value of the color wheel in the feedback signal reaches a standard, control, based on the processed dynamic brightness information and the control signal sent from the DLP module, the power module to turn on a power switch and output a corresponding current value. The power module is configured to drive, based on the corresponding current value that is output, the light source to emit light.

The technical solution of the present disclosure further provides a control method of a projector, wherein the control method comprises a main controller, a dynamic current adjustment module, a color wheel controller, a color wheel rotation speed feedback module, and a light source; the dynamic current adjustment module comprises a DLP module, a light source controller, and a power module; the color wheel controller controls rotation of a color wheel based on a control signal of the DLP module, and the color wheel rotation speed feedback module generates a feedback signal comprising an actual rotation speed value of the color wheel after the color wheel has rotated; the DLP module receives the feedback signal and determines whether the actual rotation speed value of the color wheel included in the feedback signal exceeds a color wheel rotation speed value preset by a system; when the actual rotation speed value of the color wheel exceeds the color wheel rotation speed value preset by the system, the DLP module sends processed dynamic brightness information and the control signal to the light source controller, the light source controller controls, based on the received control signal, the power module to turn on a power switch and output a corresponding current value, the processed dynamic brightness information sent from the DLP module comprises brightness information of the light source and time-sequence control information that matches sections of the color wheel, and the power module drives, based on the corresponding current value that is output, the light source to emit light; and when the actual rotation speed value of the color wheel does not exceed the color wheel rotation speed value preset by the system, the DLP module sends a control signal to the color wheel controller to adjust the rotation of the color wheel, until the actual rotation speed value of the color wheel exceeds the color wheel rotation speed value preset by the system.

The technical solution of the present disclosure further provides a control method of a projector, wherein the control method comprises a main controller, a color wheel protection and dynamic current adjustment module, a color wheel controller, and a light source; the color wheel protection and dynamic current adjustment module comprises a DLP module, a light source controller, a color wheel rotation speed feedback module, and a power module; the color wheel controller controls rotation of a color wheel based on a control signal of the DLP module, and the color wheel rotation speed feedback module generates a feedback signal comprising an actual rotation speed value of the color wheel; both the DLP module and the light source controller receive the feedback signal, and determine whether the color wheel rotation speed value included in the feedback signal exceeds the color wheel rotation speed value preset by a system; when the DLP module determines that the actual rotation speed value of the color wheel exceeds the color wheel rotation speed value preset by the system, the DLP module sends processed dynamic brightness information and a control signal to the light source controller; when the DLP module determines that the actual rotation speed value of the color wheel does not exceed the color wheel rotation speed value preset by the system, the DLP module sends a control signal to the color wheel controller to adjust the rotation of the color wheel, until the actual rotation speed value of the color wheel exceeds the color wheel rotation speed value preset by the system; when the light source controller determines that the actual rotation speed value of the color wheel exceeds the color wheel rotation speed value preset by the system, the light source controller controls, based on the received control signal, the power module to turn on a power switch and output a corresponding current value; and when the light source controller determines that the actual rotation speed value of the color wheel does not exceed the color wheel rotation speed value preset by the system, the light source controller controls the power module to maintain an off state; the power module drives, based on the corresponding current value that is output, the light source to emit light; and the processed dynamic brightness information sent from the DLP module comprises brightness information of the light source and time-sequence control information that matches sections of the color wheel.

BENEFICIAL EFFECTS

In the above aspects, the dynamic current adjustment module feeds back the actual rotation speed information of the color wheel in real time through the color wheel rotation speed feedback module, and the DLP module adjusts, based on the actual rotation speed information of the color wheel, and sends the time-sequence control information of the respective dynamic brightness information, so that the time interval at which the DLP module sends different dynamic brightness information matches the actual rotation speed of the color wheel, thereby ensuring the imaging effect of the projector while avoiding local damage to the color wheel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be illustrated with reference to the accompanying drawings and forms.

Figure 1:
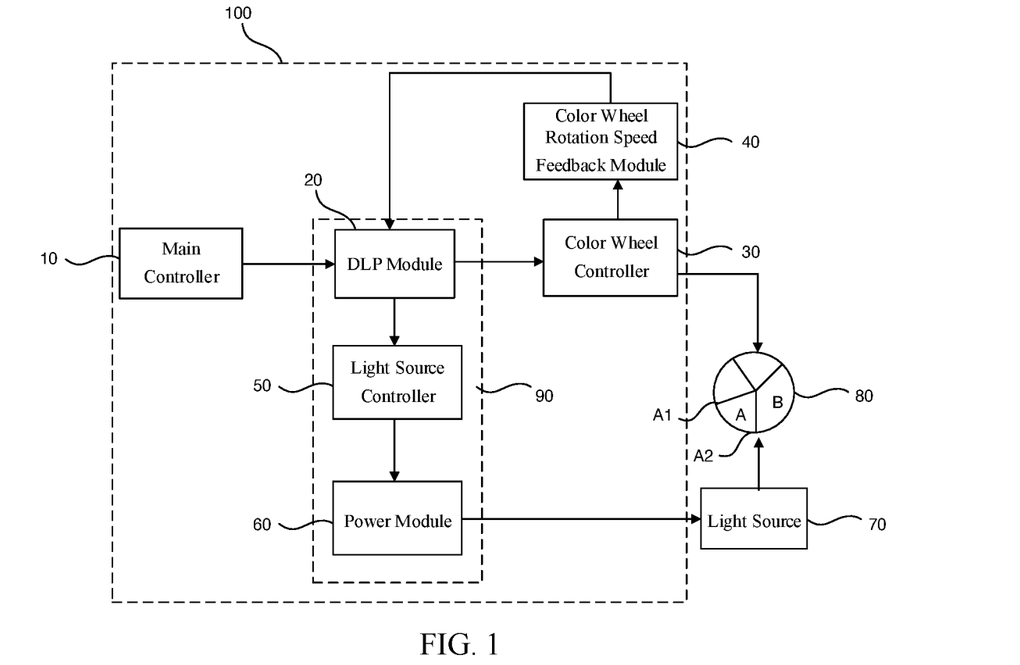
FIG. 1 is a schematic block diagram of a projector including a control system according to a form of the present disclosure.

Referring to FIG. 1, a control system of a projector according to the present disclosure is applied to a projector. The control system 100 includes a main controller 10, a dynamic current adjustment module 90, a color wheel controller 30, a color wheel rotation speed feedback module 40, and a light source 70.

Specifically, the dynamic current adjustment module 90 includes a DLP module 20, a light source controller 50, and a power module 60.

The main controller 10 is configured to send target rotation speed information and dynamic brightness information (that is, a plurality of pieces of brightness information with different brightness values) to the DLP module 20.

The DLP module 20 generates a control signal based on the target rotation speed information and transmits the control signal to the color wheel controller 30. At the same time, processed dynamic brightness information (being dynamic means corresponding to the plurality of brightness information with different brightness values respectively) is generated based on the dynamic brightness information sent from the main controller 10 and a feedback signal sent by the color wheel rotation speed feedback module 40 and including an actual rotation speed value of the color wheel, and is transmitted to the light source controller 50, and the processed dynamic brightness information includes brightness information of the light source, and time-sequence control information that matches sections of the color wheel based on the actual rotation speed of the color wheel.

The color wheel controller 30 controls the color wheel 80 to rotate at a certain speed based on the control signal.

The color wheel rotation speed feedback module 40 feeds back information on the actual rotation speed of the color wheel. Specifically, in this form, the color wheel rotation speed feedback module 40 feeds back the information on the actual rotation speed of the color wheel 80 to the DLP module 20, so that the DLP module 20 adjusts the time-sequence control information based on the information on the actual rotation speed in such a manner that a time interval at which the DLP module 20 sends out the processed dynamic lightness information matches the sections of the color wheel.

The light source controller 50 controls, based on the processed dynamic brightness information transmitted from the DLP module 20, the power module 60 to output a corresponding current value, so as to drive the light source 70 to emit light.

It can be understood that the dynamic brightness information (brightness information with varying brightness values) sent by the main controller 10 corresponds to a plurality of color wheel regions on the color wheel 80. The DLP module 20 sends out the processed brightness information based on different brightness information, so that the processed brightness information is in one to one correspondence to a certain color wheel region of the plurality of regions of the color wheel. In order to facilitate understanding, further description will be made as follows. As shown in FIG. 1, the color wheel includes A region and B region. A time interval from a time when the DLP module 20 sends out first processed brightness information corresponding to the A region of the color wheel to a time when it sends out second processed brightness information corresponding to the B region of the color wheel is T. The DLP module 20 sends the first processed brightness information corresponding to the A region of the color wheel to the light source controller 50, and the light source controller 50 controls, based on the received brightness information, the power module 60 to output a corresponding current value. Since light emission brightness of the light source is under control of a magnitude of the current value provided by the power module 60, the power module 60 drives the light source 70 to emit light according to the corresponding output current value. At first, the light just acts at A1 of the A region. With a clockwise rotation of the color wheel 80 (the color wheel 80 may also be rotated counterclockwise in other forms), the acting position of the light moves from A1 to A2. During the entire process, light intensity acting on the region A is unchanged, the light intensity is determined by the first processed brightness information, and a time length from a time at which the light acts at A1 to a time at which the light acts at A2 is exactly equal to T, that is, the current value provided by the power module 60 does not change during this time interval. The DLP module 20 sends out the second processed brightness information corresponding to the B region of the color wheel, and a magnitude of the light intensity acting on the B region is determined by the second processed brightness information, and a time length during which the light at this intensity acts on the B region is exactly equal to the time interval between a time when the DLP module 20 sends out the second processed brightness information and a time when the DLP module 20 sends out next processed brightness information, that is, the current value provided by the power module 60 does not change during this time interval.

With the projector control system according to the above forms, the color wheel rotation speed feedback module 40 feeds back the information on the actual rotation speed of the color wheel 80 in real time, and the DLP module 20 adjusts in real time, based on the actual rotation speed of the color wheel 80, the time interval at which the different processed brightness information is sent to the light source controller 50, to provide matching with the actual rotation speed of the color wheel 80, so that the region on which the light emitted by the light source 70 based on respective processed brightness information exactly corresponds to the corresponding region on the color wheel 80. Since the brightness of the light source 70 is under control of the magnitude of the current value provided by the power module 60, the current value provided from the power module 60 remains the same in each time interval, thereby achieving the purpose of current dynamic adjustment and further ensuring an imaging effect of the projector.

Furthermore, the DLP module 20 can dynamically adjust the magnitude of the current of the power module 60 corresponding to each revolution of the color wheel. In this case, the magnitude of the current of the power module 60 corresponding to each revolution of the color wheel 80 may be changed once. Without doubt, it is also possible that the magnitude of the current of the power module 60 may be changed once for multiple revolutions of the color wheel. It can be understood that each time the color wheel completely rotates one or more revolutions, the DLP module 20 sends the processed brightness information corresponding to the color wheel to the light source controller 50, and the light source controller 50 controls the power module 60 to output a corresponding current value. Since the brightness of the light source is controlled by the power module 60 to emit light, the light source 70 emits light based on the corresponding current magnitude, so as to achieve the purpose of dynamic adjustment of the current, thereby ensuring the imaging effect of the projector.

Specifically, in one form of the present disclosure, the DLP module 20 determines whether an actual rotation speed value of color wheel included in the feedback signal is larger than or equal to a color wheel rotation speed value preset by the system. If yes, then the DLP module 20 sends a control signal to the light source controller 50, the light source controller 50 controls, based on the received control signal, the power module 60 to turn on a power switch, and the DLP module 20 sends dynamic brightness information to the light source controller 50, in order to control the power module 60 to output a corresponding current value. Adopting such a setting enables that the switch of the power module 60 is not turned on when the rotation speed of the color wheel 80 doesn't reach a standard, to avoid that the rotation speed of the color wheel 80 is too slow so that the light irradiates a certain region of the color wheel 80 for a too long time, which would burn out the color wheel 80.

Optionally, each time the color wheel 80 rotates one revolution, the color wheel rotation speed feedback module 40 sends a feedback signal including the actual rotation speed value of the color wheel. In other forms, the color wheel can also rotate by half a revolution or two revolutions or other predetermined numbers of revolutions and periodically send a feedback signal including the actual rotation speed value of the color wheel.

Figure 2:
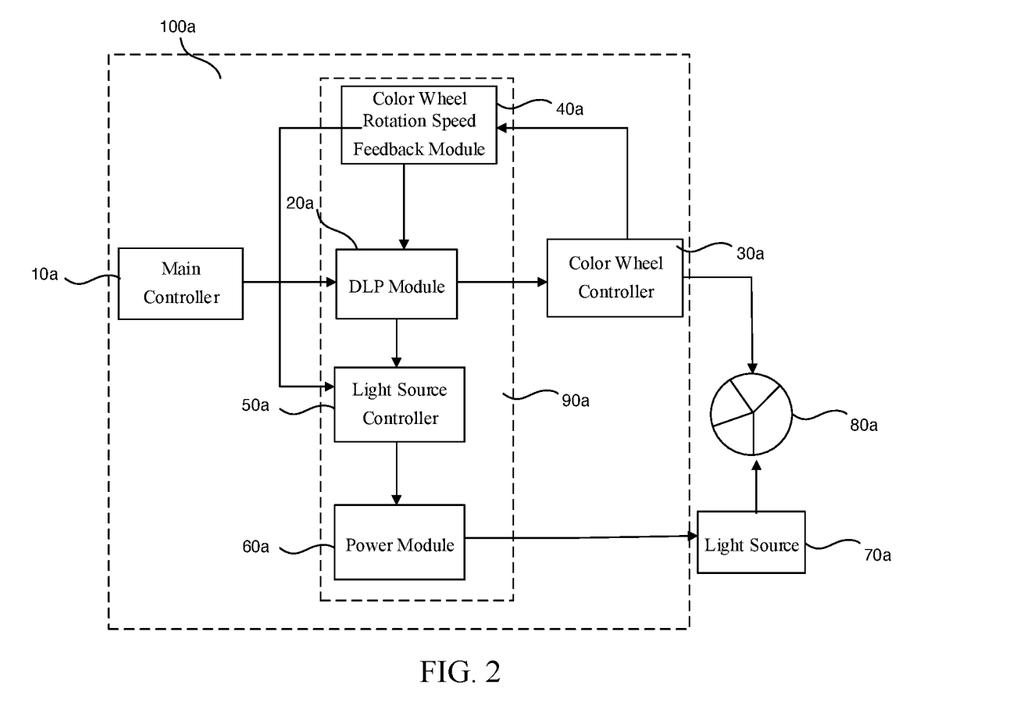
FIG. 2 is a schematic block diagram of a projector including a control system according to another form of the present disclosure.

Referring to FIG. 2, in another form, a part that plays a role of dynamic adjustment is a color wheel protection and dynamic current adjustment module 90a. The color wheel protection and dynamic current adjustment module 90a includes a DLP module 20a, a light source controller 50a, a color wheel rotation speed feedback module 40a, and a power module 60a. A difference from the first form lies in that the color wheel rotation speed feedback module 40a not only feeds back the actual rotation speed information of the color wheel to the DLP module but also feeds back the actual rotation speed information of the color wheel 80a to the light source controller 50a. The light source controller 50a determines whether the actual rotation speed of the color wheel 80a reaches a preset rotation speed standard based on the actual rotation speed information, and controls the power module 60a to generate a driving current value while reaching the rotation speed standard and outputting the processed dynamic brightness information by the DLP module 20a, to achieve the purpose of the dynamic adjustment of the current under the premise of protecting the safety of the color wheel, thereby ensuring the imaging effect of the projector.

Under this design requirement, when either the DLP module 20a or the light source controller 50a determines that the actual rotation speed value of the color wheel does not exceed the color wheel rotation speed value preset by the system, the power module 60a will not turn on the power switch. Therefore, compared with the first form where the DLP module separately controls the power switch of the power module, this form can play a dual protection role, so that the power switch of the power module will not be turned on by mistake due to system abnormality of the DLP module, thereby avoiding damage to the color wheel.

Whether the actual rotation speed reaches the preset rotation speed standard is determined as follows: if the actual rotation speed value of the color wheel included in the feedback signal is larger than or equal to the color wheel rotation speed value preset by the system, then it indicates that the rotation speed standard is reached. Under normal circumstances, the color wheel rotation speed value preset by the system in the DLP module and that in the light source controller are the same, but the color wheel rotation speed value preset by the system in the DLP module and that in the light source controller may also be different.

Figure 3:
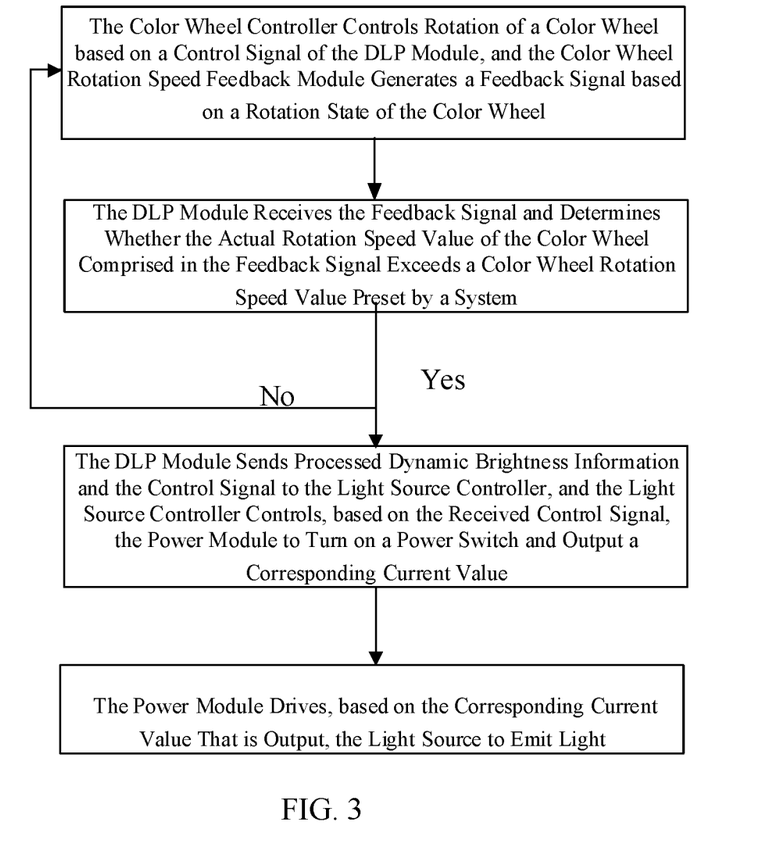
FIG. 3 is an operating flowchart of a control method corresponding to the projector in the form of FIG. 1.

The present disclosure further provides a control method of a projector. Referring to FIG. 1 and FIG. 3 in conjunction, the control method includes a main controller 10, a dynamic current adjustment module 90, a color wheel controller 30, a color wheel rotation speed feedback module 40, and a light source 70.

The dynamic current adjustment module 90 includes a DLP module 20, a light source controller 50, and a power module 60.

The color wheel controller 30 controls, based on a control signal of the DLP module 20, rotation of the color wheel 80, and the color wheel rotation speed feedback module 40 generates a feedback signal including the actual rotation speed value of the color wheel.

The DLP module 20 receives the feedback signal, and the DLP module 20 determines whether the color wheel rotation speed value included in the feedback signal exceeds the color wheel rotation speed value preset by the system; when the actual rotation speed value of the color wheel exceeds the color wheel rotation speed value preset by the system, the DLP module 20 sends processed dynamic brightness information and a control signal to the light source controller 50, the light source controller 50 controls, based on the received control signal, the power module 60 to turn on the power switch and outputs a corresponding current value, the processed dynamic brightness information sent by the DLP module 20 includes brightness information of the light source and time-sequence control information that matches the color wheel section, and the power module 60 drives the light source 70, based on the corresponding current value that is output, to emit light.

The main controller 10 sends dynamic brightness information to the DLP module 20, and the dynamic brightness information sent by the main controller includes the brightness information of the light source.

When the actual rotation speed value of the color wheel does not exceed the color wheel rotation speed value preset by the system, the DLP module 20 sends a control signal to the color wheel controller 30 to adjust the rotation of the color wheel 80, until the actual rotation speed value of the color wheel exceeds the color wheel rotation speed value preset by the system.

Figure 4:
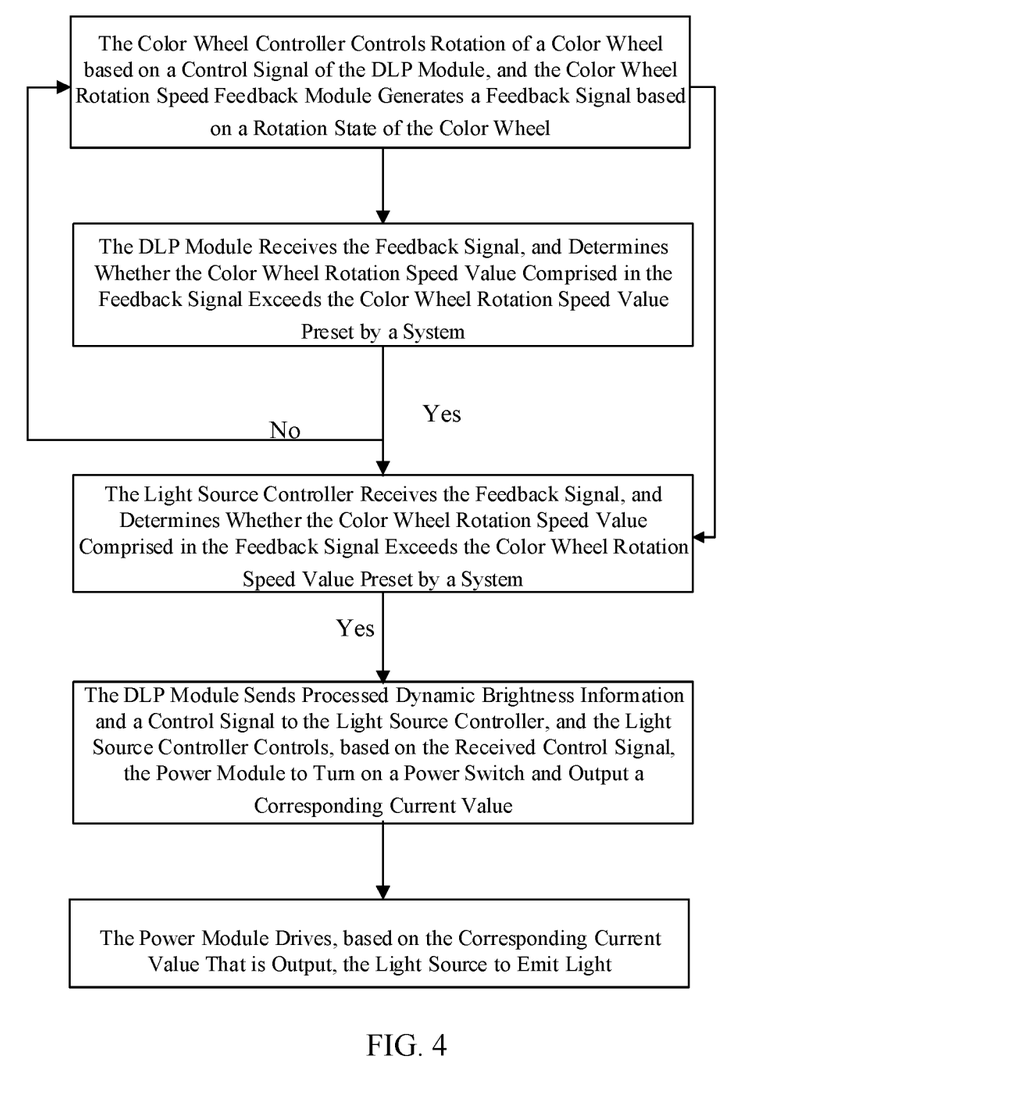
FIG. 4 is an operating flowchart of a control method corresponding to the projector in the form of FIG. 2.

Referring to FIG. 2 and FIG. 4 in conjunction, in a control method of a projector according to another form of the present disclosure, a part that plays a role of dynamic adjustment is a color wheel protection and dynamic current adjustment module 90a. The color wheel protection and dynamic current adjustment module 90a includes a DLP module 20a, a light source controller 50a, a color wheel rotation speed feedback module 40a, and a power module 60a.

A difference between this form and the previous form is that both the DLP module 20a and the light source controller 50a receive the feedback signal from the color wheel rotation speed feedback module 40a and determine whether the color wheel rotation speed value included in the feedback signal exceeds the color wheel rotation speed value preset by the system; when the DLP module 20a determines that the actual rotation speed value of the color wheel exceeds the color wheel rotation speed value preset by the system, the DLP module sends processed dynamic brightness information and a control signal to the light source controller 50a;

when the DLP module 20a determines that the actual rotation speed value of the color wheel does not exceed the color wheel rotation speed value preset by the system, the DLP module 20a sends a control signal to the color wheel controller 30a to adjust the rotation of the color wheel, until the actual rotation speed value of the color wheel exceeds the color wheel rotation speed value preset by the system;

when the light source controller 50a determines that the actual rotation speed value of the color wheel exceeds the color wheel rotation speed value preset by the system, the light source controller 50a controls, based on the received control signal, the power module 60a to turn on the power switch and outputs a corresponding current value; when the light source controller 50a determines that the actual rotation speed value of the color wheel does not exceed the color wheel rotation speed value preset by the system, the light source controller 50a controls the power module 60a to maintain an off state.

To further explain the above method, when the actual rotation speed value of the color wheel does not exceed the color wheel rotation speed value preset by the system, the DLP module 20a sends a control signal to the color wheel controller 30a to adjust the rotation of the color wheel 80a, until the actual rotation speed value of the color wheel exceeds the color wheel rotation speed value preset by the system. In the case where the actual rotation speed value of the color wheel does not exceed the color wheel rotation speed value preset by the system, the light source controller 50a does not control the power module 60a to output a corresponding current value, and the light source 70a maintains an off state. Such configuration can play a dual protection role on the color wheel 80a, so that even if the DLP module 20a is damaged and cannot adjust correspondingly based on the actual rotation speed value of the color wheel, the power switch of the power module 60a will not be turned on by mistake when the actual rotation speed value of the color wheel is smaller than the color wheel rotation speed value preset by the system, thereby avoiding damage to the color wheel 80a.

The above descriptions are merely forms of the present disclosure and do not limit the patent scope of the present disclosure. Any equivalent structure or equivalent process transformation made by using the description and drawings of the present disclosure, or those directly or indirectly used in other related technical fields are included in the patent protection scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A control system of a projector, comprising:
a main controller;
a dynamic current adjustment module comprising a digital light processing module, a light source controller, and a power module;
a color wheel controller configured to control rotation of a color wheel based on a control signal of the digital light processing module;
a color wheel rotation speed feedback module configured to generate a feedback signal comprising an actual rotation speed value of the color wheel; and
a light source,
wherein the color wheel is divided into a plurality of color wheel regions;
wherein the digital light processing module is configured to receive the feedback signal sent from the color wheel rotation speed feedback module;
wherein the main controller is configured to send dynamic brightness information comprising brightness information of the light source to the digital light processing module;
wherein the digital light processing module is further configured to receive the dynamic brightness information from the main controller and send, based on the feedback signal from the color wheel rotation speed feedback module, processed dynamic brightness information and the control signal to the light source controller, the processed dynamic brightness information sent from the digital light processing module comprising the brightness information of the light source and time-sequence control information that matches regions of the color wheel;
wherein the light source controller is configured to control, based on the processed dynamic brightness information and the control signal received from the digital light processing module, the power module to turn on a power switch and output a corresponding current value; and
wherein the power module is configured to drive, based on the corresponding current value that is output, the light source to emit light.

2. The control system according to claim 1, wherein the digital light processing module is further configured to determine whether the actual rotation speed value of the color wheel included in the feedback signal is larger than or equal to a preset rotation speed value, and if yes, to send the processed dynamic brightness information and the control signal to the light source controller, so that the power module is controlled to turn on the power switch and output the corresponding current value.

3. The control system according to claim 1, wherein light emitted by the light source acts on the color wheel regions sequentially during the rotation of the color wheel, and the digital light processing module adjusts the time-sequence control information in such a manner that the time-sequence control information matches an acting time of the light on the plurality of color wheel regions.

4. The control system according to claim 1, wherein the brightness information respectively corresponds to the plurality of color wheel regions, and the main controller adjusts the time-sequence control information in such a manner that when the light begins to act on a certain color wheel region of the plurality of color wheel regions, the digital light processing module sends the processed dynamic brightness information corresponding to the certain color wheel region to the light source controller.

5. A control system of a projector, comprising:
a main controller;
a color wheel protection and dynamic current adjustment module comprising a digital light processing module, a light source controller, a color wheel rotation speed feedback module, and a power module;
a color wheel controller configured to control rotation of a color wheel based on a control signal of the digital light processing module; and
a light source,
wherein the color wheel is divided into a plurality of color wheel regions;
wherein the color wheel rotation speed feedback module is configured to generate a feedback signal comprising an actual rotation speed value of the color wheel;
wherein the digital light processing module and the light source controller receive the feedback signal sent from the color wheel rotation speed feedback module;

wherein the main controller is configured to send dynamic brightness information comprising brightness information of the light source to the digital light processing module;

wherein the digital light processing module is configured to receive the dynamic brightness information from the main controller and send, based on the feedback signal from the color wheel rotation speed feedback module, processed dynamic brightness information and the control signal to the light source controller, the processed dynamic brightness information sent from the digital light processing module comprising the brightness information of the light source and time-sequence control information that matches regions of the color wheel;

wherein the light source controller is configured to, when the actual rotation speed value of the color wheel in the feedback signal reaches a standard, control, based on the processed dynamic brightness information and the control signal sent from the digital light processing module, the power module to turn on a power switch and output a corresponding current value; and wherein the power module is configured to drive, based on the corresponding current value that is output, the light source to emit light.

6. The control system according to claim 5, wherein both the digital light processing module and the light source controller determine whether the actual rotation speed value of the color wheel included in the feedback signal is larger than or equal to a preset rotation speed value; if the digital light processing module determines that the actual rotation speed value of the color wheel included in the feedback signal is larger than or equal to the preset rotation speed value, the digital light processing module sends the processed dynamic brightness information and the control signal to the light source controller; and if the light source controller determines that the actual rotation speed value of the color wheel included in the feedback signal is larger than or equal to the preset rotation speed value, the light source controller controls, based on the processed dynamic brightness information, the power module to turn on the power switch and output the corresponding current value.

7. The control system according to claim 5, wherein light emitted by the light source acts on the color wheel regions sequentially during the rotation of the color wheel, and the digital light processing module adjusts the time-sequence control information in such a manner that the time-sequence control information matches an acting time of the light on the plurality of color wheel regions.

8. The control system according to claim 5, wherein the brightness information respectively corresponds to the plurality of color wheel regions, and the main controller adjusts the time-sequence control information in such a manner that when the light begins to act on a certain color wheel region of the plurality of color wheel regions, the digital light processing module sends the processed dynamic brightness information corresponding to the certain color wheel region to the light source controller.

9. A control method of a projector comprising a main controller, a dynamic current adjustment module, a color wheel controller, a color wheel rotation speed feedback module, and a light source, the dynamic current adjustment module comprising a digital light processing module, a light source controller and a power module;

wherein the control method comprises steps of:

controlling, by the color wheel controller, rotation of a color wheel based on a control signal of the digital light processing module, and generating, by the color wheel rotation speed feedback module, a feedback signal comprising an actual rotation speed value of the color wheel after the color wheel has rotated;

receiving, by the digital light processing module, the feedback signal and determining whether the actual rotation speed value of the color wheel included in the feedback signal exceeds a preset rotation speed value;

when the actual rotation speed value of the color wheel exceeds the preset rotation speed value, sending, by the digital light processing module, processed dynamic brightness information and the control signal to the light source controller, controlling, by the light source controller based on the received control signal, the power module to turn on a power switch and outputting a corresponding current value, wherein the processed dynamic brightness information sent from the digital light processing module comprises brightness information of the light source and time-sequence control information that matches regions of the color wheel, and driving, by the power module based on the corresponding current value that is output, the light source to emit light; and when the actual rotation speed value of the color wheel does not exceed the preset rotation speed value, sending, by the digital light processing module, a control signal to the color wheel controller to adjust the rotation of the color wheel, until the actual rotation speed value of the color wheel exceeds the preset rotation speed value.

10. A control method of a projector comprising a main controller, a color wheel protection and dynamic current adjustment module, a color wheel controller, and a light source, the color wheel protection and dynamic current adjustment module comprising a digital light processing module, a light source controller, a color wheel rotation speed feedback module, and a power module;

wherein the control method comprises steps of:

controlling, by the color wheel controller, rotation of a color wheel based on a control signal of the digital light processing module, and generating, by the color wheel rotation speed feedback module, a feedback signal comprising an actual rotation speed value of the color wheel after the color wheel has rotated;

receiving, by both the digital light processing module and the light source controller, the feedback signal, and determining whether the color wheel rotation speed value included in the feedback signal exceeds a preset rotation speed value;

when the digital light processing module determines that the actual rotation speed value of the color wheel exceeds the preset rotation speed value, sending, by the digital light processing module processed dynamic brightness information and the control signal to the light source controller;

when the digital light processing module determines that the actual rotation speed value of the color wheel does not exceed the preset color wheel rotation speed value, sending, by the digital light processing module, control signal to the color wheel controller to adjust the rotation of the color wheel, until the actual rotation speed value of the color wheel exceeds the preset rotation speed value;

when the light source controller determines that the actual rotation speed value of the color wheel exceeds the preset rotation speed value, controlling, by the light source controller, based on the received control signal, the power module to turn on a power switch and outputting a corresponding current value; and when the light source controller determines that the actual rotation speed value of the color wheel does not exceed the preset rotation speed value, controlling, by the light source controller the power module to maintain an off state; and driving, by the power module, based on the corresponding current value that is output, the light source to emit light, wherein the processed dynamic brightness information sent from the digital light processing module comprises brightness information of the light source and time-sequence control information that matches regions of the color wheel.

* * * * *